Figure 6:
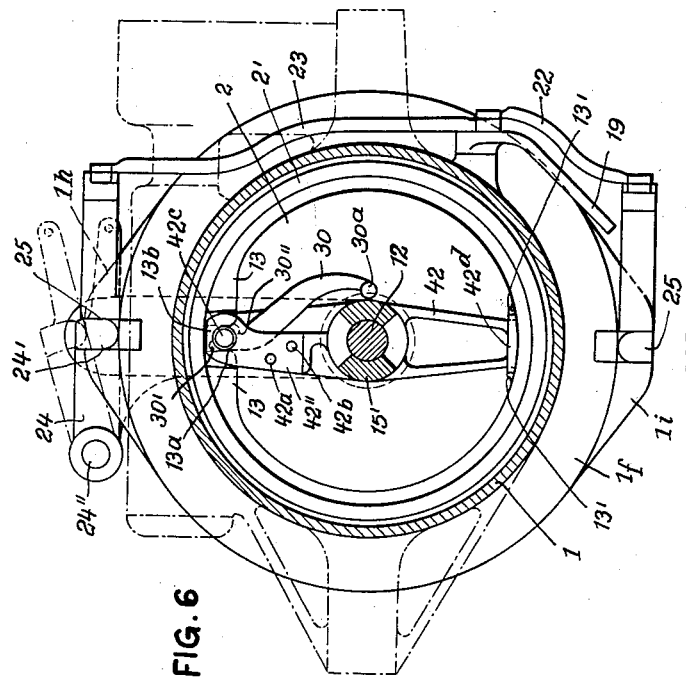

Dec. 8, 1936.    P. GANGLER    2,063,241
PARKING DEVICE
Filed Dec. 20, 1935    3 Sheets-Sheet 1
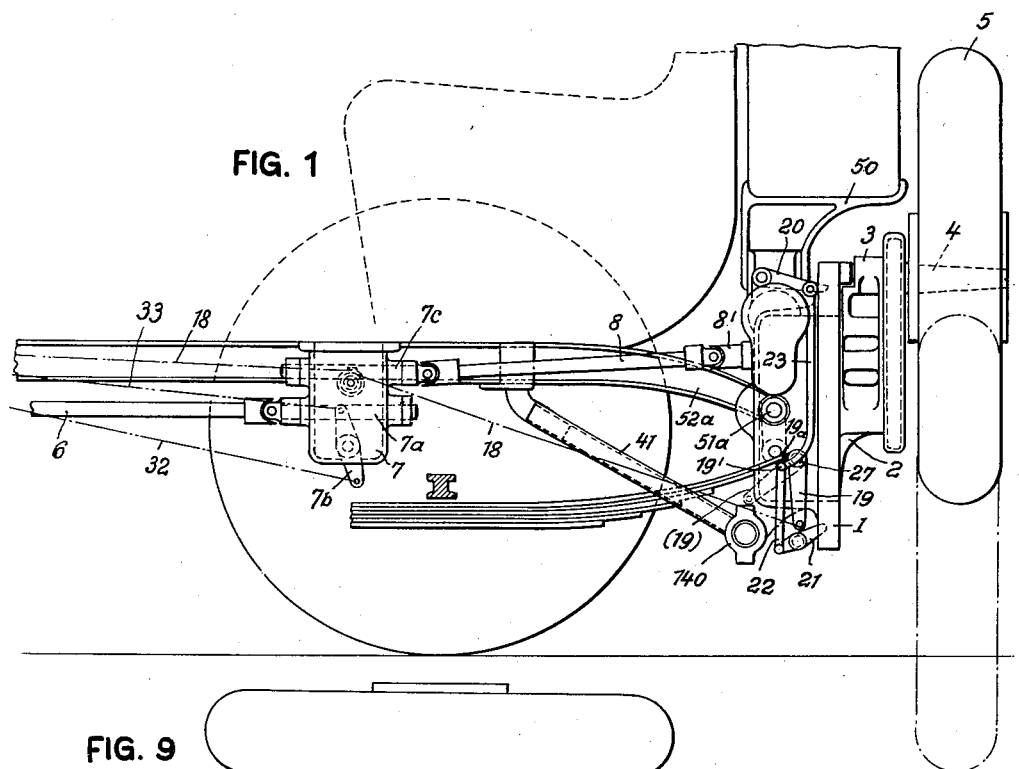
INVENTOR
PAUL GANGLER
his ATTY.

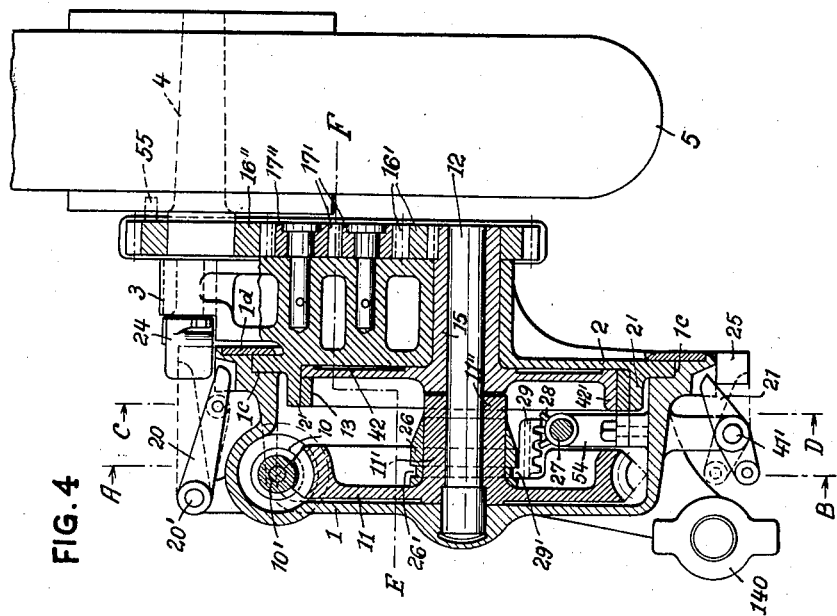
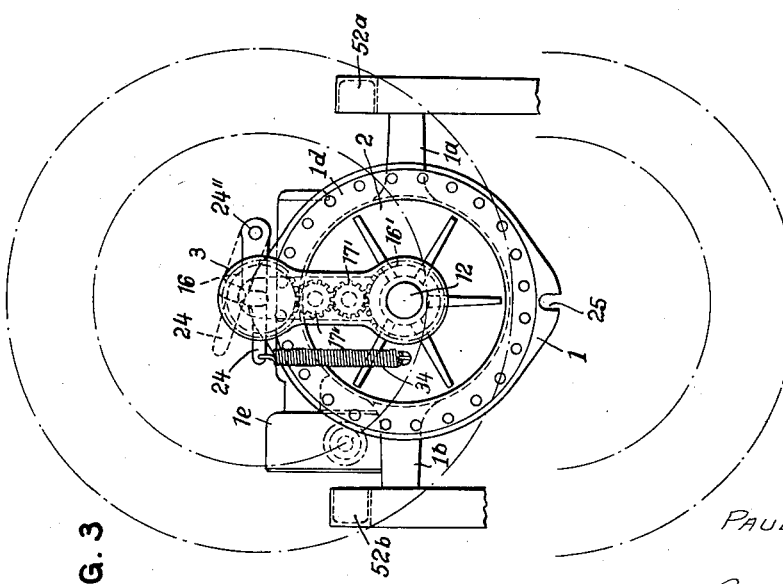

Dec. 8, 1936.  P. GANGLER  2,063,241
PARKING DEVICE
Filed Dec. 20, 1935  3 Sheets-Sheet 3

PAUL GANGLER
INVENTOR
his Atty.

Patented Dec. 8, 1936

2,063,241

UNITED STATES PATENT OFFICE 2,063,241

PARKING DEVICE

Paul Gangler, Esslingen, near Stuttgart, Germany

Application December 20, 1935, Serial No. 55,335
In Germany May 6, 1935

5 Claims. (Cl. 180—1)

My invention relates to a device adapted for automobiles and designed to lift and traverse one end of the automobile or to turn it through any desired angle for parking in the street or lodging it at any other place, this operation being accomplished by means of an auxiliary wheel, which will be named hereafter lifting wheel, and which is susceptible of a traversing movement and of a rotation, preferably by means of a spare wheel available on the vehicle.

As compared with the known devices of this class, a novel feature of my invention consists in that, when the device is rendered operative from the driver's seat, a rotary movement is imparted to the said lifting wheel, for instance the spare wheel, which is revolubly mounted on the revoluble traversing device, and the traversing device is coupled by a clutch with the rotating device of the wheel, but in such a way that every time when the traversing device has been brought through an angle of 180 degrees from its top position into its lowest position, or inversely, the clutch is disconnected automatically.

This arrangement results in an easy operation of the device and in an essential simplification of its design with the further advantage of little space being required, so that e. g. the device may be readily disposed at the rear end of the car below the trunk support, if any, and utilized for carrying the spare wheel. If desired, the device may be disposed at the forward end of the car.

The modus operandi of the device consists in that, after the device has been started, the lifting wheel is caused to rotate and continues its rotation while the traversing device is being lowered so that the wheel finally gets into contact with the ground where it rolls along while being still power-driven; it thus assists in the lifting operation and subsequently traverses the automobile to the right or to the left, in correspondence with the direction of rotation imparted to the wheel. After the automobile has been moved laterally through the angle desired, the traversing device is coupled again with the rotating device of the lifting wheel so that the end of the car is put down with its wheels upon the ground again, the clutch being disengaged automatically in the top position of the traversing device whereupon the driver disconnects the rotating device of the wheel.

An embodiment of my invention is illustrated, by way of example, in the accompanying drawings, in which Fig. 1 shows, in side-elevation, the general arrangement of such embodiment of the novel device in which the device is disposed at the rear end of an automobile and makes use of a spare wheel.

Fig. 2 is a top plan view of the device, and

Figure 7:
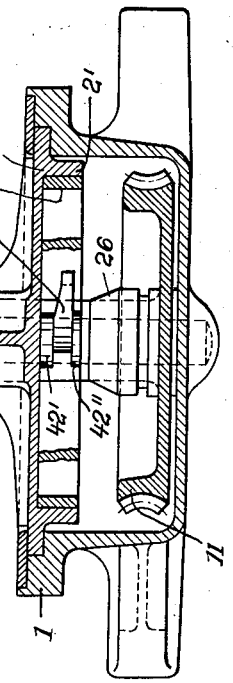
Figure 5:
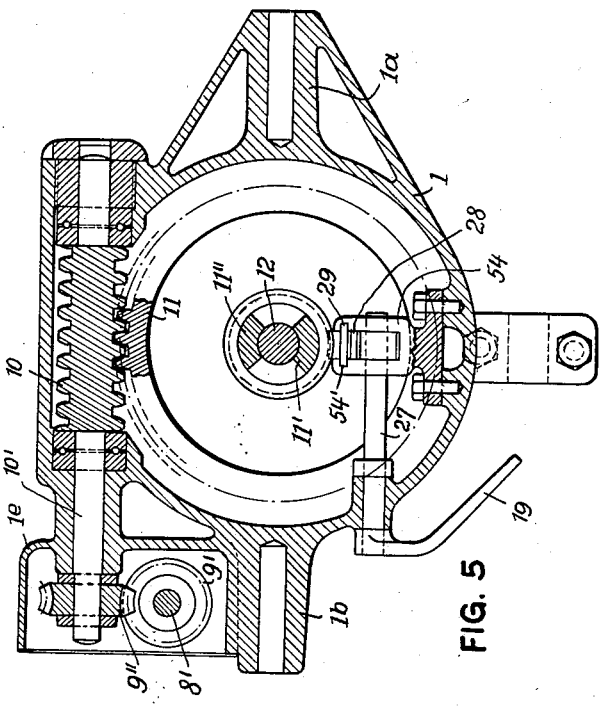

Fig. 3 is a front elevation of the same as seen from the right hand in Figs. 1 and 2, Fig. 4 shows, as a detail and on a larger scale, a vertical longitudinal section through the device, Fig. 5 is a vertical cross-section approximately on line A—B of Fig. 4, Fig. 6 is a vertical cross-section approximately on line C—D of Fig. 4, Fig. 7 is a horizontal cross-section approximately on line E—F of Fig. 4, Fig. 8 is a vertical longitudinal section, and Fig. 9 a vertical cross-section through the reversing gear.

In the embodiment shown, the device according to the invention utilizes the spare wheel 5 and is disposed below the trunk support 50, thus requiring no additional space.

The casing 1 of the device is preferably made of a suitable light metal and is, by means of two lateral sleeve-like extensions 1a and 1b, suspended from the usual spring shackle bolts 51a and 51b of the side members 52a and 52b of the car frame. The casing is stiffened by a pipe 41 bent into an angle, the apex of said pipe extending through an eye 140 of the casing 1 and the two ends thereof being secured to the said side members 52a and 52b of the frame.

The substantially circular casing is closed by a disc 2 of cast steel or the like, which is revolubly mounted on an annular seat 1c provided at the open end of the casing 1 and held in place by a ring 1d which is suitably secured to the casing. The disc 2 is provided with a crank 3 cast integral therewith or fastened thereto in any suitable manner. The crank 3 carries at its upper end a wheel pivot 4 cast integral therewith or suitably fastened thereto and intended for receiving the spare wheel 5 to be pivotally mounted thereon.

Both the disc 2 and the spare wheel 5 are revolved by means of a jointed drive shaft 6 which can be operatively connected by the driver to the engine shaft of the car in the well-known way by means of a gear of the conventional type in order to act through a suitable reversing gear 7 on a jointed drive shaft 8 which is adapted to drive the shaft 8' of a helical gear 9' suitably mounted in a case-like extension 1e of the casing 1. The helical gear 9' meshes with another helical wheel 9'' keyed onto a shaft 10' which is provided with a worm 10 and suitably mounted in the casing 1. The worm 10 meshes with a worm wheel 11 which is by means of its tubular hub 11' revolubly mounted on the central shaft 12. At its right-hand end, the hub 11' is provided with two jaws 11'' adapted to engage with suitable jaws 15' of a hollow shaft 15 in order to couple this hollow shaft 15 always with the worm wheel 11 so as to transmit a rotatory movement. To the front end of the hollow shaft 15, there is secured a spur wheel 16' which is adapted to drive the spur wheel 16'' which is revolubly mounted on the wheel pivot 4, through the intermediate idlers 17' and 17'' which are revolubly mounted on the crank 3 in order to rotate the wheel 5 which is detachably connected to the said spur wheel 16'' by means of a coupling pin 55. This pin is secured to the wheel 16'' and adapted to enter a suitable hole provided in the hub portion of the wheel 5.

A spoke-like arm 42 of the hollow shaft 15 carries a splitted coupling ring 13. According to Fig. 6, two lateral axial lugs 13' of the coupling ring 13 are shoved over a suitable ledge 42d at the bottom end of the arm 42 so that the coupling ring 13 is thus taken along by the arm 42 of the hollow shaft 15 when the same is rotated. Between the upper arm 42' of the spoke 42, see also Fig. 7, and a member 42'' which is fastened to the arm 42' at 42a and 42b, there is pivoted on a pin 42c a spreading lever 30 carrying cams 30' and 30'' disposed between the ends 13a and 13b of the splitted coupling ring 13. The coupling ring 13 is mounted within an inner annular flange 2' of the revoluble disc 2 to be coupled with the said ring 13.

The free end 30a of the spreading lever 30 is disposed in the path of a tapered sleeve 26, cf. Figs. 4 and 7, which is slidably mounted on the hub 11' so that it can be displaced in an axial direction relatively to the hollow shaft 15 by means of a rack 29 which with a jaw 29' engages an annular groove 26' of the tapered sleeve 26, and is slidably guided at 54' in a bracket 54 fastened to the bottom of the casing 1, as shown in Fig. 5. The teeth of this rack 29 mesh with the teeth of a sector 28 mounted on a shaft 27 which is journalled in the said bracket 54. The outside end of this shaft 27 carries a lever 19 to which the end of a cable 18 or the like is secured. By pulling the cable 18 the driver can bring the lever 19 from the position shown by full lines in Fig. 1, into the position shown by dotted lines at (19) in Fig. 1, so that the tapered sleeve 26 will be displaced from the position shown in Fig. 4 to the right towards the spreading lever 30 through the intermediary of the toothed sector 28 and the rack 29.

In order to secure the crank 3 in its upper position as well as in its lower position angularly spaced through an angle of 180 degrees, the flange 1f of the casing 1 is at the respective points provided with cams 1h and 1i, respectively, having each a notch or recess 25. At the top end of the crank 3 and on the side thereof, there is pivoted at 24'' a lever 24 provided with a suitable lug or tooth 24' which is adapted to engage one of the said notches 25 at a time, the lever 24 being yieldingly pulled towards the center by a spring 34 attached to its free end.

The lever 24 is disengaged from the top or bottom notch 25 by means of levers 20 and 21 which are pivotally mounted on the casing 1 at 20' and 21', respectively, and connected by suitable links 23 and 22, respectively, with the pin 19' of a lateral arm 19a of the lever 19, as is shown by Fig. 1. When the lever 19 is in its neutral position illustrated by full lines in Fig. 1 the disengaging levers 20 and 21 occupy their inoperative positions shown by Figs 1 and 4. When, however, by a pull exerted on the said cable 18 the lever 19 is brought into the position marked by dotted lines at (19) in Fig. 1, the arm 19a and the links 23 and 22, respectively, will lift the disengaging lever 20 and lower the disengaging lever 21 so that the locking lever 24 will, according to its engagement with the top or bottom notch 25 of the casing flange 1f, be brought out of engagement with the particular notch concerned.

In the drawings, the reversing gear 7 is shown in its inoperative or idle position. It is of the usual type and comprises the two pinions 36 and 38 which are not revoluble but simultaneously displaceable by means of the lever 7b lengthwise on the shaft 7a driven by the jointed shaft 6, the two pinions 37 and 39 keyed to the shaft 7c which is suitably coupled with the jointed shaft 8, and the lateral pinion 40 keyed to the shaft 7d and held in permanent mesh with the pinion 39. The double-armed lever 7b is actuated by the driver by means of the two cables 32 and 33, cf. Fig. 1. According to the direction desired of the rotation of the wheel 5, the lever 7b will be so shifted that it will displace the pinions 36, 38 to the left into the left-hand end position or to the right into the right-hand end position on shaft 7a. In the first instance, the pinion 36 will mesh directly with the pinion 37 and revolve the shaft 7c and thus the jointed shaft 8 in one direction. When displaced to the right, the pinion 38 will mesh with the lateral or intermediary pinion 40 so that through the pinion 39 the shaft 7c will be driven in the opposite direction.

The device is operated as follows:

The drawings show the device in the position in which the spare wheel 5 occupies its ordinary and inoperative top position.

When it is the question of lifting the rear end of the automobile and of moving it laterally to the right or to the left, the driver couples the shaft 6 with the engine shaft, shifts the lever 7b of the reversing gear into the position required for the direction desired of the revolution of wheel 5, and brings the engaging lever 19, by means of cable 18, into the position (19) shown by dotted lines in Fig. 1. By the shaft 6 being driven, the jointed shaft 8 will be driven through the intermediary of the reversing gear 7 so that a rotary movement is imparted to the gear 9', 9'', 10 and 11, to the hub 11' and to the hollow shaft 15 and through the gear 16', 17', 17'' and 16'' transmitted to the wheel 5 which is thus rotated in the direction desired. By the lever 19 being shifted, the disengaging levers 20, 21 are through the links 23 and 22 likewise turned, against the tension of the spring 34, upwards and downwards, respectively, so that through the lever 24 the lug 24' will be disengaged from the top notch 25 so as to release the disc 2. At the same time, the angular displacement of the lever 19 will result in the tapered sleeve 26 being displaced to the right in Fig. 4 through the intermediary of the shaft 27 and the gear 28, 29. By this displacement of the conical sleeve 26 the conical surface of the sleeve impacts against the lower free end of lever 30 which formerly was in the position shown in Fig. 6 and is now swung outwardly about the bearing pin 42c to the right in Fig. 6. In consequence of this swinging movement the cams 30' and 30'' engage the respective ends 13a and 13b of the split coupling ring 13 and move the free ends 13a and 13b outwardly whereby the coupling ring 13 is spread in frictional engagement with the flange 2' of the disc 2. The disc 2 is thus coupled with the hollow shaft 15 which will impart a rotatory movement to the disc 2 with the crank 3. Consequently, the disc 2 will be revolved through an angle of 180 degrees until the lug 24' of the lever 24 taken along with the said disc will, under the tension of the spring 34, drop into the lower notch 25 and so allow the return of the levers 20, 21 and consequently of the engagement lever 19 into the positions shown by full lines in Fig. 1. In this way, the coupling engagement of the disc 2 with the hollow shaft 15 will be interrupted so that only the rotatory movement of the spare wheel 5 will continue. By the rotation of the disc 2 with its crank 3 through an angle of 180 degrees, the automobile has been lifted at its rear end so that it will now be moved transversely to the right or to the left by the continued rotatory movement of the wheel 5, in accordance with the position of the reversing gear 7. As soon as the rear end of the car has arrived at the lateral position desired, the driver pulls the cable 18 again so as to bring the coupling ring 13 into its operative condition. In the manner above described, the lower disengaging lever 21 will now withdraw the lug 24' of lever 24 from the lower notch 25 so that the disc 2 with the spare wheel 5 mounted thereon will turn again upwards until the lug 24' of the lever 24 has dropped into the top notch 25. In this way, the car is put again on its running wheels whereupon the shaft 6 will be disconnected from the engine shaft.

While the disc 2 is revolving, the lug 24' of the lever 24 taking part in this revolution, slides along the periphery of the casing flange 1f. As this flange is provided with the cams 1h and 1i, respectively, by the sides of the two notches 25, the lever 24 is lifted by the particular cam shortly prior to the engagement of the lug 24' with the particular notch, so that the spring 34 is additionally stretched in order that the dropping of the lug 24' into the notch 25 concerned is supported and ensured.

It is obvious that various changes may be made in the device shown and described as an embodiment of the present invention, without departing from the spirit of the invention and the scope of the claims. The following claims, therefore, define the invention and its equivalents only as much as determined by the state of the art.

What I claim is:

1. A device of the type specified for lifting and traversing one end of an automobile, comprising in combination, a central driving shaft, means comprising a reversible gear to rotate said shaft from the automobile engine, a support turnably mounted on said shaft, a detachable auxiliary wheel rotatably mounted eccentrically on the support, means for transmitting rotation from the shaft to the wheel, controllable means adapted to couple said turnable support with said driving shaft, said support being arranged to move, in its turning movement, the wheel from a lifted inoperative position into a lowered operative position enabling the wheel to lift the end of the car, and means adapted to disconnect automatically the coupling of the turnable support with the driving shaft each time the wheel has been moved into its lowered operative position or into its lifted inoperative position.

2. A device of the type specified for lifting and traversing one end of an automobile, comprising, in combination, a central driving shaft, means for rotating said shaft in either direction, a disc rotatably mounted on said shaft and carrying a crank-like support provided with a crank pin, an auxiliary wheel rotatably mounted on the crank pin, means for transmitting rotation from the said driving shaft to the wheel, controllable means adapted to couple said rotatable disc with this shaft, said crank-like support being adapted to move, in the rotation of the said disc, the auxiliary wheel from a lifted inoperative position into a lowered operative position enabling the wheel to lift the end of the car, and vice versa, and means adapted to disconnect automatically the coupling of the said disc with the driving shaft each time the wheel has been moved into its lowered operative position or into its lifted inoperative position.

3. A device of the type specified for lifting and traversing one end of an automobile, comprising, in combination, a central driving shaft, means for rotating said shaft in either direction, a disc rotatably mounted on said shaft and carrying a crank-like support provided with a crank pin, a detachable wheel rotatably mounted on the crank pin, means for transmitting rotation from the said driving shaft to the wheel, controllable means adapted to couple said disc with the driving shaft, said crank-like support being adapted to move, in the rotation of the disc, the wheel from a lifted inoperative position into a lowered operative position enabling the wheel to lift the end of the car, and vice versa, and means adapted to disconnect automatically the coupling of the said disc with the driving shaft each time the wheel has been moved into its lower operative position or into its lifted inoperative position, said coupling means comprising a lateral annular flange on the said rotatable disc, a splitted extensible coupling ring mounted concentrically within this annular flange on an arm secured to the driving shaft, means for spreading said splitted coupling ring into frictional contact with said lateral flange of the disc and comprising an operative lever pivoted on the said arm and projecting with its free end in the path of a conical sleeve displaceable on the driving shaft, and means comprising a controllable lever and a gear for displacing the said sleeve into an operative position or into an inoperative position with respect to the free end of the said operative lever of the spreading means.

4. A device of the type specified for lifting and traversing one end of an automobile, comprising, in combination, a central driving shaft rotatably mounted in a cylindric casing, means for rotating said shaft in either direction, a disc rotatably mounted on the said shaft and carrying a crank-like support provided with a crank pin, an auxiliary wheel rotatably mounted on the crank pin, means for transmitting rotation from the driving shaft to the wheel, controllable means adapted to couple said rotatable disc with the said shaft, said support being adapted to move, in the rotation of the disc, the wheel from a lifted inoperative position into a lowered operative position enabling the wheel to lift the end of the car, and vice versa, and means adapted to disconnect automatically the coupling of the disc with the driving shaft each time the wheel has been moved into its lower operative position or into its lifted inoperative position, said disconnecting means consisting of a locking lever pivoted on said disc and having a lug adapted to slide, in the rotation of the disc, on a circumferential annular rib of the said casing and to enter recesses provided in the said rib at the points of lifted and lower positions, respectively, of the wheel, a spring being provided to hold the said locking lever with its lug in resilient contact with the circumferential rib of the casing.

5. A device of the type specified for lifting and traversing one end of an automobile, comprising in combination, a central driving shaft rotatably mounted in a cylindric casing, means for rotating said shaft in either direction, a disc rotatably mounted on the said shaft and carrying a cranklike support provided with a crank pin, an auxiliary wheel rotatably mounted on the crank pin, means for transmitting rotation from the driving shaft to the wheel, coupling means comprising a controllable lever and adapted to couple said rotatable disc with the said shaft, said support being adapted to move, in the rotation of the disc, the wheel from a lifted inoperative position into a lowered operative position enabling the wheel to lift the end of the car, and vice versa, means to disconnect automatically the coupling of the disc with the driving shaft each time the wheel has been moved into its lower operative position or into its lifted inoperative position, and consisting of a spring actuated locking lever pivoted on said disc and having a lug adapted to slide, in the rotation of the disc and under the spring action, on a circumferential annular rib of the said casing and to enter locking recesses provided in the said rib at the points of lifted and lower positions, respectively, of the wheel, and means for disengaging the said locking lever, comprising two lifting arms, each of which is pivotally mounted on the casing at each locking recess thereof and with its free end beneath the recess respective, the lifting arms being operatively connected to the said controllable lever of the coupling means so as to be swung outwardly against the tension of the said spring when the controllable lever is moved into its operative position.

PAUL GANGLER.